Feb. 21, 1956  K. ZINNER  2,735,411
METHOD OF OPERATING SUPERCHARGED FOUR-STROKE
INTERNAL-COMBUSTION ENGINES
Filed Dec. 29, 1949  2 Sheets-Sheet 1
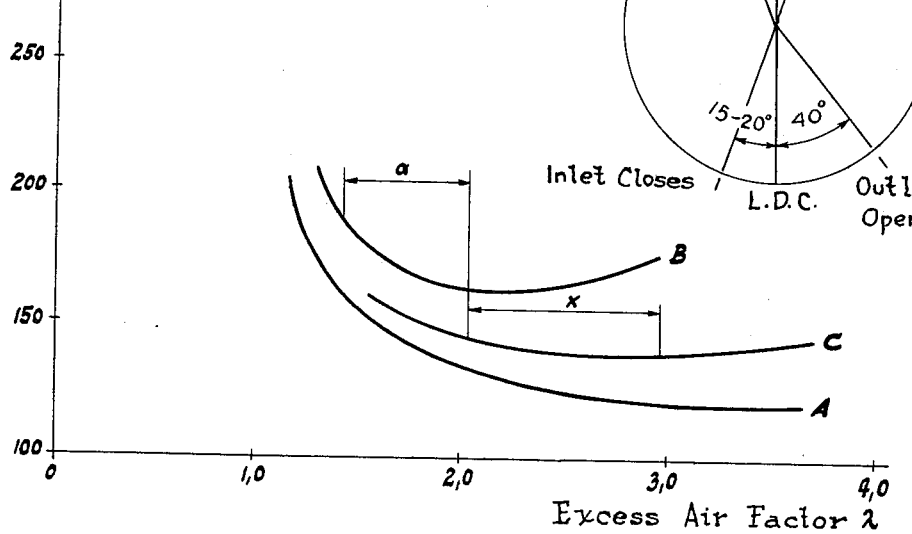
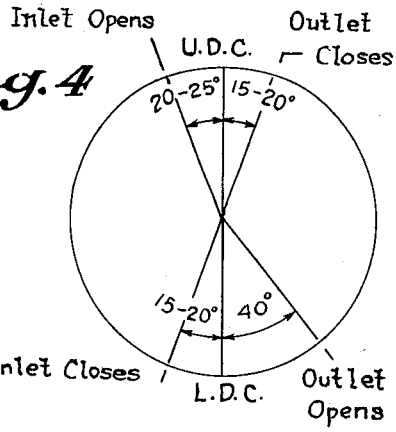
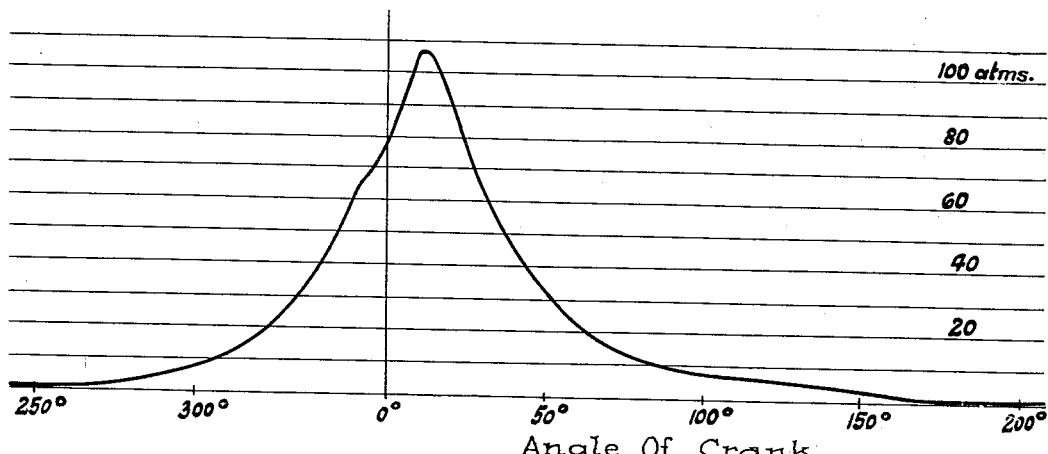
INVENTOR
Karl Zinner
BY
Marechal & Biebel
ATTORNEYS

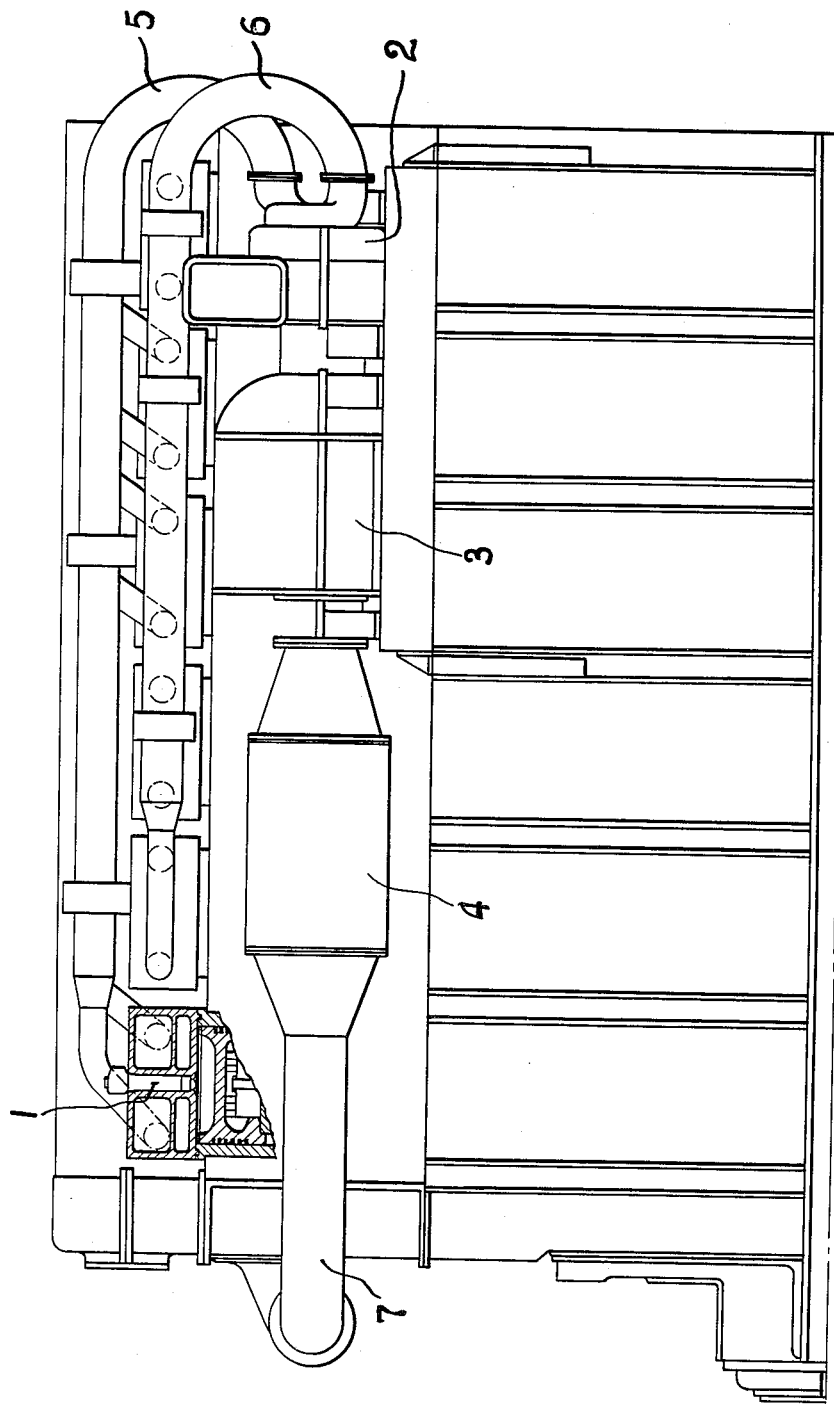

United States Patent Office 2,735,411
Patented Feb. 21, 1956

2,735,411
METHOD OF OPERATING SUPERCHARGED FOUR-STROKE INTERNAL-COMBUSTION ENGINES

Karl Zinner, Augsburg, Germany, assignor to Maschinenfabrik Augsburg-Nurnberg A. G., Augsburg, Germany, a corporation of Germany Application December 29, 1949, Serial No. 135,735
Claims priority, application Germany August 6, 1949

3 Claims. (Cl. 123—1)

This invention relates to a four-stroke internal combustion engine, more particularly, a diesel engine, supercharged by an exhaust gas turbo-compressor.

It is the object of the invention to provide a method of operation by which a minimum fuel consumption can be attained in combination with a high output. An increase of the supercharging pressure, e. g., above 2 kgs./cm.$^2$ absolute pressure and a corresponding increase of the average useful pressure or mean effective pressure, e. g., over 12 kgs./cm.$^2$ already has been suggested and practically tried by various investigators. However, these known measures did not lead to a corresponding reduction of the specific fuel consumption of the diesel engine.

According to the present invention, a number of features are combined in operating the engine, which features will be hereinafter described with reference to the accompanying drawing, showing by way of example and purely schematically some diagrams exemplifying the invention and in which:

Fig. 1 is a diagram showing the fuel consumption of a four stroke internal combustion engine under various conditions, plotted against the excess of air factor $\lambda$, Fig. 2 is a diagram showing the pressure course in the cylinder of a four stroke engine supercharged in accordance with the present invention, plotted against the position or angle of the crank, Fig. 3 is a showing of a diesel engine for use in accordance with the present invention, and Fig. 4 is a diagram of the valve timing of an engine operating according to the present invention.

I have found that the following measures have to be applied in combination in a highly supercharged internal combustion engine with a supercharging pressure above 2 kgs./cm.$^2$ absolute pressure and a mean effective pressure above 12 kgs./cm.$^2$, in order to increase the efficiency of the engine:

1. Application of maximum combustion pressures between 85 and 160 kgs./cm.$^2$ above atmospheric, the compression ratio being such that the ignition pressure is at least 15 kgs./cm.$^2$ above the pressure at the end of the compression.

In case of engines which are not supercharged or moderately supercharged, the amount of the corresponding ignition pressure is not paid much attention to. More particularly in case of smaller engines the mechanical dimensions are always so large, e. g. with a view to the minimum wall thicknesses which can be manufactured by casting, that no difficulties arise in regard to the control of the gas pressures produced by the combustion. In small high speed engines the stresses produced by mass forces mostly determine the dimensions rather than the stresses due to gas forces. The matter becomes different, however, where very high supercharging pressures are applied, so that gas pressures of 100 kgs./cm.$^2$ and more may occur. In this case it is advisable to utilize the limit of the admissible amount of pressure defined by the mechanical dimensions of the engine, without exceeding this limit, however. At a given maximum pressure according to the theoretical diagram the efficiency of an internal combustion engine is a maximum if this admissible maximum pressure is reached already by the compression and if the combustion of the injected fuel takes place by a constant pressure cycle without a further increase of pressure. Contrary to this adjustment which according to the theory is most favorable, according to the invention the ratio of compression is chosen so that the admissible maximum pressure is not reached by the compression, but that at least a margin of 15 kgs./cm.$^2$ is still available for an increase of pressure due to the combustion. Practice has shown this adjustment to be favorable and decisive for achieving optimum conditions as regards fuel consumption.

2. Provision of an excess of air for the combustion which already at full load is at least twice the minimum amount of air required for complete combustion, using an overlapping factor of the inlet and exhaust valves of such an amount that the residual gases are substantially only scavenged out of the cylinder without an excessive scavenging of the cylinder.

In diesel engines the indicated fuel consumption decreases with increasing excess of air, but this decrease in small above $\lambda=2$, being the factor indicating the excess of air. The course of the indicated fuel consumption $b_i$ in dependence of the excess of air coefficient $\lambda$ will be seen from curve A of Fig. 1 Thus a large excess of air on the one hand means a low indicated consumption, but also a reduction of the output, since in this case only a smaller amount of fuel can be burnt in the cylinder at a given amount of air available therein. The losses due to friction are increasing with decreasing output, which results in an increase of the effective fuel consumption with decreasing output or increasing excess of air. In case of non-supercharged engines the excess of air coefficient for full load ranges between 1.2 and 1.8, depending on the size of the engine. True, in case of supercharged engines a larger total excess of air coefficient is provided in order to reduce the temperature; however, the total excess of air subdivides into cylinder air and scavenging air. Only the former is available for combustion of the injected fuel and the excess of air coefficients adjusted in this case do not exceed the values which are usual for engines without supercharging. In the conventional supercharged engines large valve overlappings are applied, whereby considerable amounts of air are scavenged through the cylinder with a relatively low supercharging pressure. The effective fuel consumption follows approximately the curve B in Figure 1, the coefficient of excess of air of the combustion for full load always remaining below $\lambda=2$. The zone $a$ in the diagram defines the full load region in case of supercharged engines of an existing design.

Contrary thereto in the method of operation according to the present invention no air or only a very small amount of air is scavenged through the cylinder. The whole air delivered by the blower is available for combustion in the cylinder, whereby the zone of the more favorable indicated fuel consumption is reached as per curve C in Figure 1. The zone $x$ defines the full load region in case of supercharging after the method according to the invention. In order that this amount of air is available in the cylinder, however, the supercharging pressures must become higher than usual. In spite of the absence of scavenging the temperatures do not rise in the working cycle according to the invention, since the total throughputs of air through the engine do not become smaller as compared to the conventional method. On the contrary by the improvement of the fuel consumption a reduction of the temperatures takes place in case of unchanged specific output.

3. Application of a low temperature of the supercharging air or recooling of the supercharging air to a temperature so that the adiabatic rise of temperature caused by the pressure ratio of the supercharging compressor is not exceeded.

Through the cooling of the supercharging air the average temperature level of the cycle is lowered, whereby the heat losses through the cylinder walls can be reduced and the working reliability of the engine at a given load is improved.

By the combination and simultaneous application of these three features a fuel consumption obtains which is substantially below the optimum attainable with the conventional operation of internal combustion engines.

Fig. 2 shows a diagram which has been recorded in a four stroke engine having a cylinder diameter of 220 mms. and a stroke of 330 mms. supercharged in accordance with the invention. The pressure characteristic is shown plotted against the crank angle. In a non-supercharged condition this engine has an optimum fuel consumption of 171 grams per horsepower hour. By supercharging the engine in accordance with the invention it has been possible to attain an optimum fuel consumption of 145 grams per horsepower hour.

The operating conditions characterized by the diagram, Fig. 2, have been subjected to a more detailed analysis. The supercharging pressure in this case amounted to about 1.5 kgs./cm.$^2$ above atmospheric, the maximum pressure in the cylinder according to the diagram amounts to 107 kgs./cm.$^2$ above atmospheric, the increase of pressure caused by the combustion amounts to about 37 kgs./cm.$^2$. Under these conditions the following data have been obtained compared to the non-supercharged engine.

|  | Super-charged operation | Non-super-charged engine |
|---|---|---|
| Indicated efficiency | 0.496 | 0.47 |
| Mechanical efficiency | 0.865 | 0.8 |
| Effective efficiency | 0.429 | 0.376 |
| Heat losses through the walls of the cylinder, in relation to the heat of the fuel___percent__ | 0.9 | 3.6 |
| Mean effective pressure_____kgs./cm.$^2$__ | 12.6 | 5.5 |

In case of a measured net calorific power of $Hu=10,180$ cal./kg. the said effective efficiences correspond to fuel consumption figures of 145 or 171 grams/horsepower hour.

Referring to Fig. 3, a diesel engine to which the present invention has been applied is shown and, as indicated, is an injection engine having a supercharger and means for cooling the supercharged air. One cylinder is boken out in the drawing showing the injection nozzle 1. The supercharging unit consists of the exhaust gas turbine 2, blower 3 driven by the turbine, and the cooling unit 4 for cooling the compressed air prior to introduction into the cylinder. Exhaust gases proceeding from the cylinders pass through exhaust gas conduits 5 and 6 to the exhaust turbine 2. The cooled highly compressed air passes from the cooling unit 4 through conduit 7 into the inlet manifolds (not shown) for introduction into cylinders in well-known manner. Fig. 4 diagrammatically illustrates the valve timing (in terms of crank shaft angle of rotation) according to the present invention whereby the inlet valve opens 20° to 25° before upper dead center of the piston and closes 15° to 20° after lower dead center, while the outlet valve opens 40° before lower dead center and closes 15° to 20° after upper dead center.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. The method of operating a four-stroke cycle diesel engine operating with a supercharging pressure above 2 kgs./cm.$^2$ absolute and a mean effective pressure above 12 kgs./cm.$^2$ to obtain substantially improved specific fuel economy comprising the steps of supercharging air for supply to the engine, cooling the supercharged air to a temperature such that the adiabatic rise of temperature caused by the supercharging is not exceeded, introducing said cooled supercharged air into the engine in a controlled quantity of two to three times the stoichiometric amount of air required for complete combustion, retaining substantially the entire quantity of said air in the engine cylinder, compressing said air during the compression stroke to a pressure of approximately 70 to 145 atmospheres in the absence of combustion, and causing during combustion a substantial pressure increase of at least 15 atmospheres above the pressure at the end of said compression by introduction of fuel into said compressed air to produce said power stoke.

2. The method of operating a four-stroke cycle diesel engine operating with supercharging at an absolute pressure above 2 kgs./cm.$^2$ and a mean effective pressure above 12 kgs./cm$^2$ and having a compression ratio such that the maximum pressure at the end of compression is at least 15 atmospheres below the maximum combustion pressure which includes the steps of cooling the supercharging air to a temperature such that the adiabatic rise of temperature caused by the supercharging is not exceeded, introducing said cooled supercharged air into the engine in controlled quantity at least two to three times the stoichiometric amount of air required for complete combustion, retaining substantially the entire quantity of said air in said engine after no more than a limited amount of scavenging, compressing said air to a pressure of approximately 70 to 145 atmospheres, and introducing fuel into said compressed air with resulting pressure increase during combustion of approximately 15 atmospheres.

3. The method of operating a four-stroke cycle diesel engine operating with supercharging at an absolute pressure above 2 kgs./cm$^2$ and a mean effective pressure above 12 kgs./cm.$^2$ to obtain increased efficiency and specific fuel economy which comprises the steps of cooling the supercharging air to a temperature such that the adiabatic rise of temperature caused by the supercharging is not exceeded, supplying said cooled supercharged air into the cylinder of said engine, retaining in said cylinder after scavenging a quantity of air at least two to three times the stoichiometric amount of air required for complete combustion of injected fuel, compressing said quantity of air in said cylinder prior to combustion to a predetermined pressure of above approximately 70 atmospheres, and injecting fuel into said cylinder for combustion therein with accompanying increase of pressure therein of approximately 15 atmospheres.

References Cited in the file of this patent

UNITED STATES PATENTS

| 1,508,707 | Moss | Sept. 16, 1924 |
| 1,821,790 | Canning | Sept. 1, 1931 |
| 2,235,710 | Hoffmann | Mar. 18, 1941 |

OTHER REFERENCES

The High Speed Internal Combustion Engine, Ricardo pub. by Blackie and Lon Ltd., London and Glasgow 1931, pages 402–405.

Diesel Engineering Hankbook, 1944 edition, pub. by Diesel Publications, Inc., 192 Lexington Ave., N. Y. C., pages 18–28.

The Oil Engine Manual, D. S. D. Williams and J. Miller Smith, pub. by Temple Press Ltd., London 1939, pages 19–24.

Diesel Aviation Engines, P. H. Wilkinson, pub. by New York Aeronautics Council, Inc., 1942, page 23.